US009224089B2

(12) United States Patent
Majumdar et al.

(10) Patent No.: US 9,224,089 B2
(45) Date of Patent: Dec. 29, 2015

(54) METHOD AND APPARATUS FOR ADAPTIVE BIT-ALLOCATION IN NEURAL SYSTEMS

(75) Inventors: Somdeb Majumdar, San Diego, CA (US); Venkat Rangan, San Diego, CA (US); Jeffrey A. Levin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 461 days.

(21) Appl. No.: 13/568,782

(22) Filed: Aug. 7, 2012

(65) Prior Publication Data

US 2014/0046885 A1    Feb. 13, 2014

(51) Int. Cl.
*G06N 3/02* (2006.01)
*G06N 3/04* (2006.01)
*G10L 19/038* (2013.01)
*G10L 19/12* (2013.01)

(52) U.S. Cl.
CPC .............. *G06N 3/02* (2013.01); *G06N 3/049* (2013.01); *G10L 19/038* (2013.01); *G10L 19/12* (2013.01)

(58) Field of Classification Search
None
See application file for complete search history.

(56) References Cited

U.S. PATENT DOCUMENTS

| 4,972,187 | A | 11/1990 | Wecker |
| 5,402,124 | A * | 3/1995 | Todd et al. .................... 341/131 |
| 6,125,201 | A * | 9/2000 | Zador ......................... 382/166 |
| 6,480,621 | B1 | 11/2002 | Lyon |
| 6,952,677 | B1 * | 10/2005 | Absar et al. .................. 704/500 |
| 7,337,025 | B1 * | 2/2008 | Absar et al. .................... 700/94 |
| 7,400,588 | B2 * | 7/2008 | Izzat et al. .................... 370/252 |
| 7,548,775 | B2 * | 6/2009 | Kipke et al. .................. 600/378 |
| 7,844,556 | B2 * | 11/2010 | Edelman et al. ................ 706/15 |
| 2004/0146103 | A1 * | 7/2004 | Chang et al. ............ 375/240.03 |
| 2005/0159947 | A1 * | 7/2005 | Chen et al. .................... 704/230 |
| 2008/0298469 | A1 * | 12/2008 | Liu et al. .................. 375/240.26 |
| 2011/0090950 | A1 | 4/2011 | Bush et al. |
| 2011/0153315 | A1 * | 6/2011 | Majumdar et al. ............ 704/203 |

OTHER PUBLICATIONS

"Neural network approaches to image compression", Robert D. Dony, Simon Haykin, Proceedings of the IEEE, vol. 83, Issue 2, Feb. 1995, pp. 288-303.*
"A systems approach for data compression and latency reduction in cortically controlled brain machine interfaces", Karim G. Oweiss, Biomedical Engineering, IEEE Transactions on, vol. 53, Issue 7, Jul. 2006, pp. 1364-1377.*
Kosko, "Bidirectional Associative Memories," IEEE Transactions on Systems, Man and Cybernetics, vol. 18, Issue: 1, DOI: 10.1109/21.87054, Publication Year: 1988, pp. 49-60.

(Continued)

*Primary Examiner* — Ben Rifkin
*Assistant Examiner* — Mai T Tran
(74) *Attorney, Agent, or Firm* — Linda G. Gunderson

(57) ABSTRACT

Certain aspects of the present disclosure support a technique for adaptive bit-allocation in neural systems. Bit-allocation for neural signals and parameters in a neural network described in the present disclosure may comprise for a plurality of synapse circuits in the neural simulator network, dynamically allocating a number of bits to the neural circuit signals based on at least one characteristic of one or more neural potential in the neural simulator network; and for the plurality of synapse circuits in the neural simulator network, dynamically allocating a number of bits to at least one neural processing parameter of the synapse circuit based on at least one condition of the neural simulator network.

48 Claims, 11 Drawing Sheets

(56) References Cited

OTHER PUBLICATIONS

Manry et al. "Cramer Rao Maximum A-Posteriori Bounds on Neural Network Training Error for Non-Gaussian Signals and Parameters," International Journal of Intelligent Control and Syst., vol. 1, No. 3, 1996, pp. 381-391.

Pahlavan, "Nonlinear Quantization and the Design of Coded and Uncoded Signal Constellations," IEEE Transactions on Communications, vol. 39, No. 8, Aug. 1991, pp. 1207-1215.

Cloutier, J., et al., "Hardware implementation of the backpropagation without multiplication", Proceedings of the 4th International Conference on Microelectronics for Neural Networks and Fuzzy Systems (ICMNN94), Sep. 26, 1994, pp. 46-55, XP010222633, DOI: 10.1109/ICMNN.1994.593174 Sections 1 and 2.

International Search Report and Written Opinion—PCT/US2013/053290—ISA/EPO—Feb. 11, 2014.

Jian, B., et al., "Neural networks with limited precision weights and its application in embedded systems", Proceedings of the 2nd International Workshop on Education Technology and Computer Science (ETCS'10), Mar. 6, 2010, pp. 86-91, XP031673183, DOI: 10.1109/ETCS.2010.448 the whole document.

Modi, S., "Dynamic word-length variation in artificial neural network digital hardware", An investigation into adaptive power reduction techniques for neural hardware, Jun. 8, 2012, pp. 66-83, XP055100160, Retrieved from the Internet:URL:http://eprints.soton.ac.uk/id/eprint/209079 [retrieved on Feb. 3, 2014], Sections 5.1 and 5.2.

Pfeil, T., et al., "Is a 4-bit synaptic weight resolution enough?—constraints on enabling spike-timing dependent plasticity in neuromorphic hardware", Frontiers in Neuroscience, vol. 6, 90, Jul. 17, 2012, XP055100158, DOI: 10.3389/fnins.2012.00090 the whole document.

Taiwan Search Report—TW102127985—TIPO—Mar. 10, 2015.

\* cited by examiner

METHOD AND APPARATUS FOR ADAPTIVE BIT-ALLOCATION IN NEURAL SYSTEMS

BACKGROUND

1. Field

Certain aspects of the present disclosure generally relate to neural system engineering and, more particularly, to a method and apparatus for optimized representation of variables in neural systems.

2. Background

Neural signals and parameters of a neural system (e.g., synaptic weights, neural states, etc) can be represented in quantized form with a pre-defined bit precision and stored in a system memory for further use. It can be desirable to save the memory space of the neural system by optimizing a number of bits allocated for various neural data structures. The main goal is to determine the allocation of bits such that to minimize a number of utilized (stored) bits while maintaining particular performance metric(s) of the neural system, such as timing accuracy of neural spike, a rate of neural spiking, a learning rate of synapses, etc.

SUMMARY

Certain aspects of the present disclosure provide a method of bit-allocation for neural signals and parameters in a neural network. The method generally includes allocating quantization levels to the neural signals based on at least one measure of sensitivity of a pre-determined performance metric to quantization errors in the neural signals, and allocating bits to the parameters based on the at least one measure of sensitivity of the pre-determined performance metric to quantization errors in the parameters.

Certain aspects of the present disclosure provide an apparatus for bit-allocation for neural signals and parameters in a neural network. The apparatus generally includes a first circuit configured to allocate quantization levels to the neural signals based on at least one measure of sensitivity of a pre-determined performance metric to quantization errors in the neural signals, a second circuit configured to allocate bits to the parameters based on the at least one measure of sensitivity of the pre-determined performance metric to quantization errors in the parameters, and a third circuit configured to reduce the quantization errors in the neural signals representing neural dynamics by systematically dithering a number of Least Significant Bits (LSBs) of the allocated quantization levels.

Certain aspects of the present disclosure provide an apparatus for bit-allocation for neural signals and parameters in a neural network. The apparatus generally includes means for allocating quantization levels to the neural signals based on at least one measure of sensitivity of a pre-determined performance metric to quantization errors in the neural signals, means for allocating bits to the parameters based on the at least one measure of sensitivity of the pre-determined performance metric to quantization errors in the parameters, means for reducing the quantization errors in the neural signals representing neural dynamics by systematically dithering a number of Least Significant Bits (LSBs) of the allocated quantization levels, and means for adapting the number of LSBs based on at least one measure of sensitivity of the pre-determined performance metric to perturbations in the neural signals.

Certain aspects of the present disclosure provide a computer program product for bit-allocation for neural signals and parameters in a neural network. The computer program product generally includes a computer-readable medium comprising code for allocating quantization levels to the neural signals based on at least one measure of sensitivity of a pre-determined performance metric to quantization errors in the neural signals, and allocating bits to the parameters based on the at least one measure of sensitivity of the pre-determined performance metric to quantization errors in the parameters.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System

Figure 1:
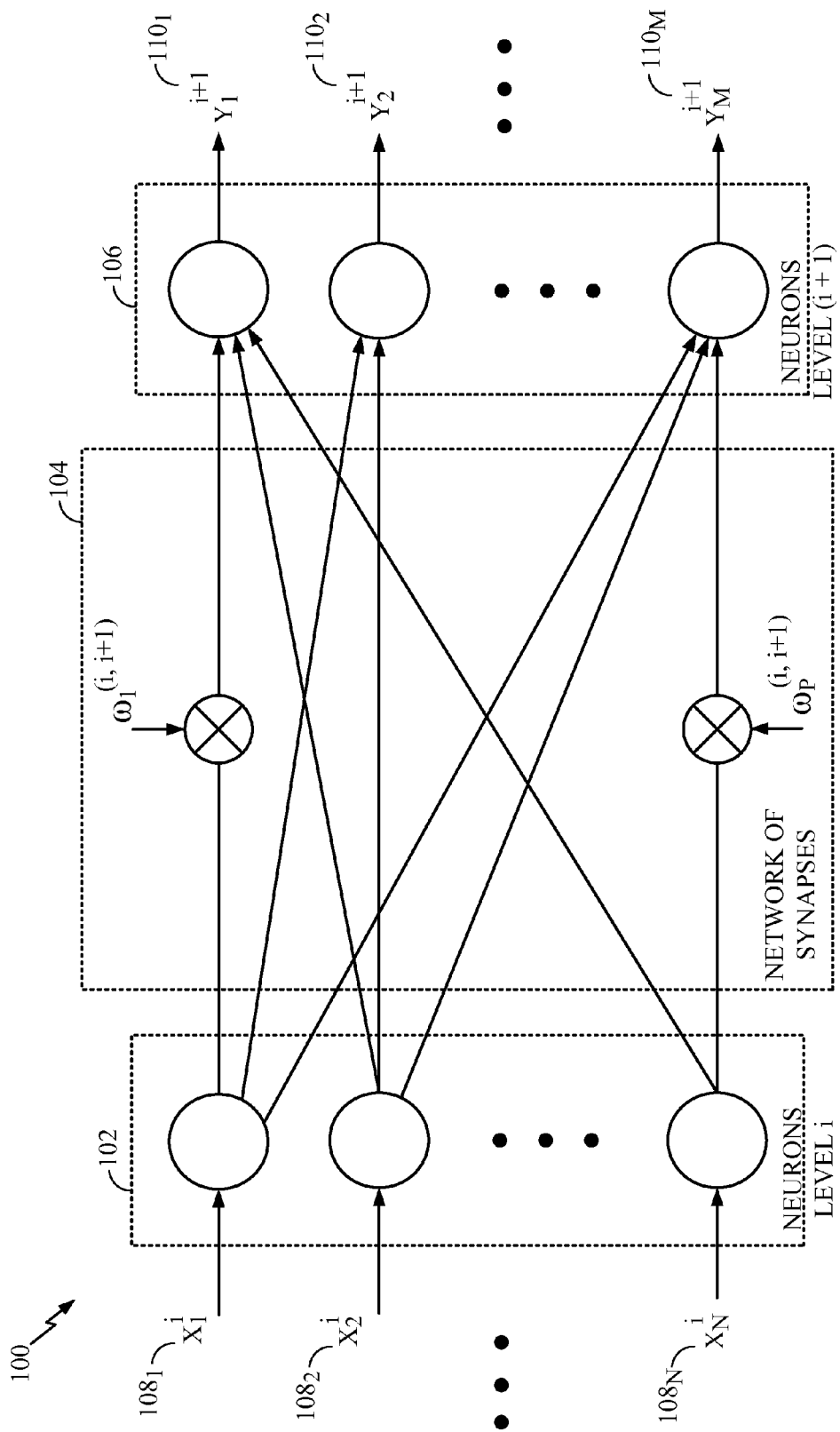
FIG. 1 illustrates an example network of neurons in accordance with certain aspects of the present disclosure.

FIG. 1 illustrates an example neural system 100 with multiple levels of neurons in accordance with certain aspects of the present disclosure. The neural system 100 may comprise a level of neurons 102 connected to another level of neurons 106 though a network of synaptic connections 104. For simplicity, only two levels of neurons are illustrated in FIG. 1, although fewer or more levels of neurons may exist in a typical neural system.

As illustrated in FIG. 1, each neuron in the level 102 may receive an input signal 108 that may be generated by a plurality of neurons of a previous level (not shown in FIG. 1). The signal 108 may represent an input current of the level 102 neuron. This current may be accumulated on the neuron membrane to charge a membrane potential. When the membrane potential reaches its threshold value, the neuron may fire and generate an output spike to be transferred to the next level of neurons (e.g., the level 106).

The transfer of spikes from one level of neurons to another may be achieved through the network of synaptic connections (or simply "synapses") 104, as illustrated in FIG. 1. The synapses 104 may receive output signals (i.e., spikes) from the level 102 neurons (pre-synaptic neurons relative to the synapses 104), and scale those signals according to adjustable synaptic weights $w_1^{(i,i+1)}, \ldots, w_P^{(i,i+1)}$ (where P is a total number of synaptic connections between the neurons of levels 102 and 106). Further, the scaled signals may be combined as an input signal of each neuron in the level 106 (post-synaptic neurons relative to the synapses 104). Every neuron in the level 106 may generate output spikes 110 based on the corresponding combined input signal. The output spikes 110 may be then transferred to another level of neurons using another network of synaptic connections (not shown in FIG. 1).

The neural system 100 may be emulated by an electrical circuit and utilized in a large range of applications, such as image and pattern recognition, machine learning, motor control, and alike. Each neuron in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, wherein synaptic weight changes may relate to changes of the memristor resistance. With nanometer feature-sized memristors, the area of neuron circuit and synapses may be substantially reduced, which may make implementation of a very large-scale neural system hardware implementation practical.

Figure 2:
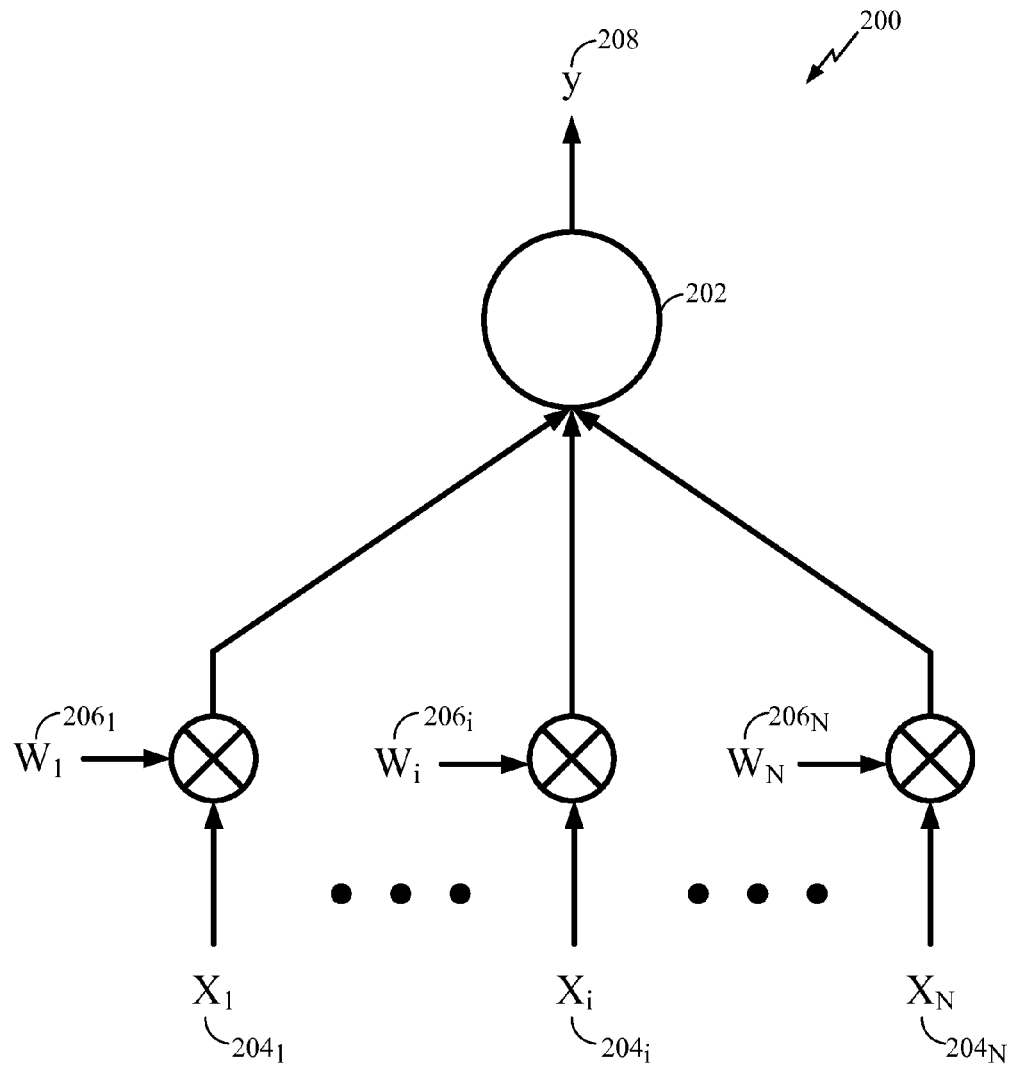
FIG. 2 illustrates an example of a processing unit (neuron) of a computational network (neural system or neural network) in accordance with certain aspects of the present disclosure.

FIG. 2 illustrates an example 200 of a processing unit (e.g., a neuron) 202 of a computational network (e.g., a neural system or a neural network) in accordance with certain aspects of the present disclosure. For example, the neuron 202 may correspond to any of the neurons of levels 102 and 106 from FIG. 1. The neuron 202 may receive multiple input signals $204_1$-$204_N$ ($x_1$-$x_N$), which may be signals external to the neural system, or signals generated by other neurons of the same neural system, or both. The input signal may be a current or a voltage, real-valued or complex-valued. The input signal may comprise a numerical value with a fixed-point or a floating-point representation. These input signals may be delivered to the neuron 202 through synaptic connections that scale the signals according to adjustable synaptic weights $206_1$-$206_N$ ($w_1$-$w_N$), where N may be a total number of input connections of the neuron 202.

The neuron 202 may combine the scaled input signals and use the combined scaled inputs to generate an output signal 208 (i.e., a signal y). The output signal 208 may be a current, or a voltage, real-valued or complex-valued. The output signal may comprise a numerical value with a fixed-point or a floating-point representation. The output signal 208 may be then transferred as an input signal to other neurons of the same neural system, or as an input signal to the same neuron 202, or as an output of the neural system.

The processing unit (neuron) 202 may be emulated by an electrical circuit, and its input and output connections may be emulated by wires with synaptic circuits. The processing unit 202, its input and output connections may also be emulated by a software code. The processing unit 202 may also be emulated by an electric circuit, whereas its input and output connections may be emulated by a software code. In one aspect of the present disclosure, the processing unit 202 in the computational network may comprise an analog electrical circuit. In another aspect, the processing unit 202 may comprise a digital electrical circuit. In yet another aspect, the processing unit 202 may comprise a mixed-signal electrical circuit with both analog and digital components. The computational network may comprise processing units in any of the aforementioned forms. The computational network (neural system or neural network) using such processing units may be utilized in a large range of applications, such as image and pattern recognition, machine learning, motor control, and alike.

During the course of training of neural network, synaptic weights (e.g., the weights $w_1^{(i,i+1)}, \ldots, w_P^{(i,i+1)}$ from FIG. 1 and/or the weights $206_1$-$206_N$ from FIG. 2) may be initialized with random values and changed in small increments according to a learning rule. Some examples of the learning rule are the spike-timing-dependent plasticity (STDP) learning rule, the Hebb rule, the Oja rule, the Bienenstock-Copper-Munro (BCM) rule, etc.

Representation of Neural System Variables

Neural signals (system variables) and parameters (e.g., synaptic weights, neural states, etc) of a neural system (e.g., the neural system 100 from FIG. 1) can be represented in quantized form with a pre-determined bit precision and stored in a system memory for further use. It is, therefore, desirable to save the memory space of the neural system by optimizing a number of bits allocated for various neural data structures. To achieve this, different characteristics and statistical properties of neural signals may need to be observed before performing appropriate quantization. Allocation of bits for representing neural data structures should be determined such that to minimize the number of utilized (stored) bits while maintaining particular performance metric(s), such as spike timing accuracy, neural spiking rate, learning rate, and so on.

A neural system (e.g., the neural system 100 from FIG. 1) may be designed as a neural simulator that stores all its data in various data structures (synapses, neural states, etc). The neural simulator can be viewed as a non-linear filter with filter coefficients (i.e., neural system parameters) that need a storage space. The question is how to optimize the number of bits allocated for system parameters (filter coefficients) in order to optimize the size of storage space. In order to minimize the memory footprint in the neural simulator, it may be needed to reduce the memory consumed by various data structures. Furthermore, various neural signals (including intermediate stages of signals) that represent input signals in a neural system are dynamic signals (i.e., they are variable over time), which makes the neural system being a dynamic system. The question is how to adapt the bit allocation over time for each of these neural signals.

Certain aspects of the present disclosure support compressed representation of neural states and signals using a non-linear quantization. In an aspect, the non-linear quantization can be observed by (passively/actively) probing any observable variables, such as synapse weights. Quantization levels may be optimized to minimize error in key metrics, such as spike timing, spiking rate, sub-threshold behavior, learning rate, etc. To achieve this, it may be also needed to take into account various operating regions for the neurons and synapses.

It may be desirable to dynamically decide how many bits to allocate for a particular window of neural data. This could be based on statistical analysis of the previous time frames, on how good the spike timing was in the past, accuracy of performance metrics (in the past), and some other heuristics. For example, it is more important when the spike is forming (e.g., the exact position of spike time is critical) and resolution for spike representation in this region should be higher. On the other hand, a decay period after the spike's peak is not that important, and the resolution for spike representation in this region can be lower. In an aspect of the present disclosure, a logic may be configured to detect whether a signal is on the positive part of the spike (onset region) or on the negative part of the spike (decay region), and then to accordingly change bit allocations for these parts.

In an aspect of the present disclosure, neural state optimizations may be achieved by observing operating regions of a neuron (e.g., of the neuron circuit 202 from FIG. 2). Neurons typically operate close to their resting potential. Therefore, high resolution for neural signal representation may be needed in this region of operation. Once the neuron crosses the threshold voltage, it will spike unless there is a large inhibitory spike. A coarse bit representation may be sufficient in this operating region.

One example of system parameters can be synaptic weights that represent states of synapses. It should be noted that non-linear encoding of the synaptic weights may result in much smaller bit-widths, which may also improve the synaptic density in a neural system. In addition, various compression schemes may have different effect on learning.

During learning, synaptic weights (represented with a fixed number of bits) are changing, which affects a learning rate. Synapses in a particular part of a neural network may have more sensitivity to the learning rate, while some other synapses are not that sensitive. In an aspect of the present disclosure, based on this sensitivity analysis, bits for representing synaptic weights can be distributed differently for different synapses. In addition, if synapses have weights close to zero, then they may not be that sensitive to learning and lower resolution for their bit representation may be sufficient. On the other hand, higher resolution may be needed for synaptic weights that have larger values and are more sensitive to a learning process.

For intermediate representations of neural signals, the pseudo-noise (PN) dithered rounding may be utilized to improve accuracy of quantization. The PN dithering may be closely related to hardware implementation. Most neural models are full precision models, and when implemented in hardware (e.g., using 16 bits, 18 bits, or 20 bits) a systematic quantization error may occur. This error may often drift with respect to where a mean value should be. In order to avoid this drifting, when bits are being allocated, one may apply the PN dithering by adding a defined number of Least Significant Bits (LSBs) of the allocated bit value (e.g., one or two LSBs). Then, instead of drifting, the quantization error may oscillate around some mean value. Certain aspects of the present disclosure support performing adaptive dithering where the amount of dither is decided based on similar metrics used for bit allocation, such as spike timing, spiking rate, sub-threshold behavior, learning rate, etc.

One advantage of the PN dithering is that it can result in a smaller number of bits for signal representation. For example, for a region of signal not that sensitive to the aforementioned performance metrics, 16 bits may be allocated instead of 20 bits. However, the PN dithering of certain amount of LSBs may be put around the signal to limit a quantization error due to less number of bits being used for quantization.

Methodology for Optimized Representation of Neural System Variables

Figure 3:
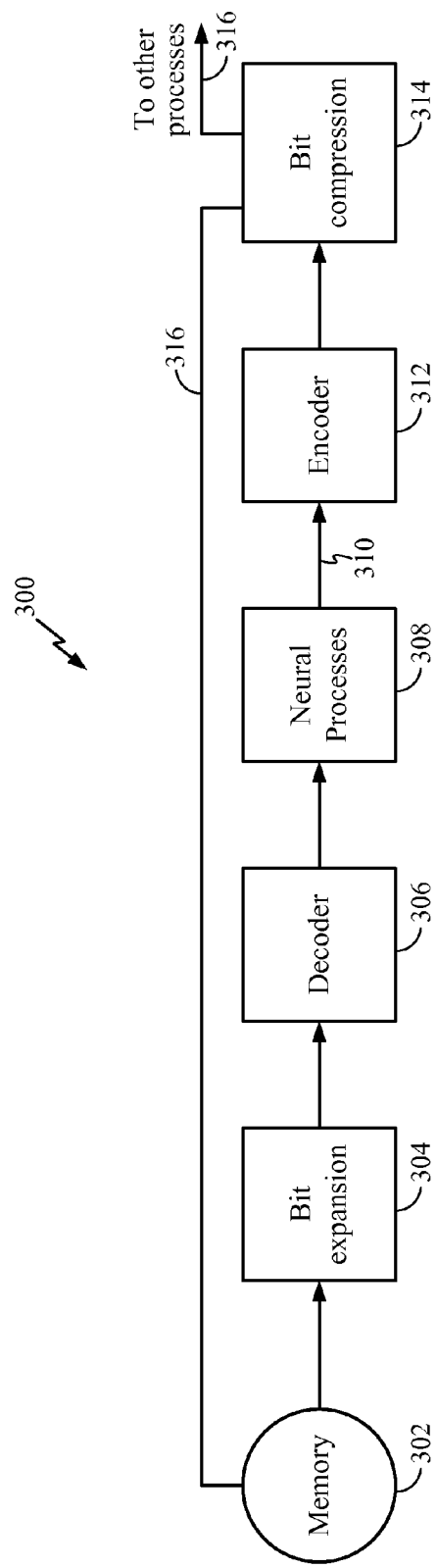
FIG. 3 illustrates an example system methodology in accordance with certain aspects of the present disclosure.

FIG. 3 illustrates an example neural system 300 in accordance with certain aspects of the present disclosure. Neural states may be stored in "encoded/compressed form" in a memory 302. After retrieval from the memory 302, states may pass through a bit expansion module (or de-quantizer) 304 and a decoder 306 to get back data to a bit expansion domain, e.g., the Pulse Code Modulation (PCM) domain. Neural processes may be performed by a processor/module 308 in full precision, wherein neural dynamics may be performed in fixed point. Resultant data 310 may be encoded by an encoder 312 and compressed by a bit compression module (quantizer) 314. Compressed data 316 may be either stored back in the memory 302 or passed to other processes in a neural system.

Encoder and Decoder

In an aspect of the present disclosure, the encoder 312 may be configured as a non-linear weighting function module that amplifies certain regions in the morphology based on its "importance". The amplified regions can better utilize the available bits, thereby improving Signal-to-Quantization-Noise Ratio (SQNR) in those regions. "Importance" of a region can be defined, for example, as sensitivity of a performance metric (e.g., spike timing accuracy) to quantization noise in that region. The encoder 312 may be configured such that to have a sense what region is important and what region is not. The actual quantizer (e.g., the quantizer 314 from FIG. 3) can remain uniform in nature. In an aspect, the decoder 306 may be inverse of encoder 312 prior to bit expansion. For example, the encoding/decoding functionality may be similar to mu-law and a-law type companding.

It should be also noted that, during learning, higher resolution (higher precision) may be required for representing various neural states. Therefore, larger memory footprint 302 may be needed. On the other hand, if learning in a neural network is mostly done, lower resolution (lower precision) may be sufficient for representing various neural states. This may save memory, as well as power dissipation while performing neural processes in the module 308 of the system 300 from FIG. 3.

In another aspect of the present disclosure, instead of implementing the encoder and decoder as weighting functions, they can be directly embedded in the quantizer/dequantizer. In this case, the quantizer may be non-uniform in nature with a step size being defined by a non-linear function. For example, fine grain resolution may be allocated to lower values of signal amplitudes, while coarse grain resolution may be allocated for higher values of signal amplitudes. Functionally, this approach is similar to uniform quantizer with encoder/decoder; ease of implementation can dictate choice.

Implementation

Figure 4:
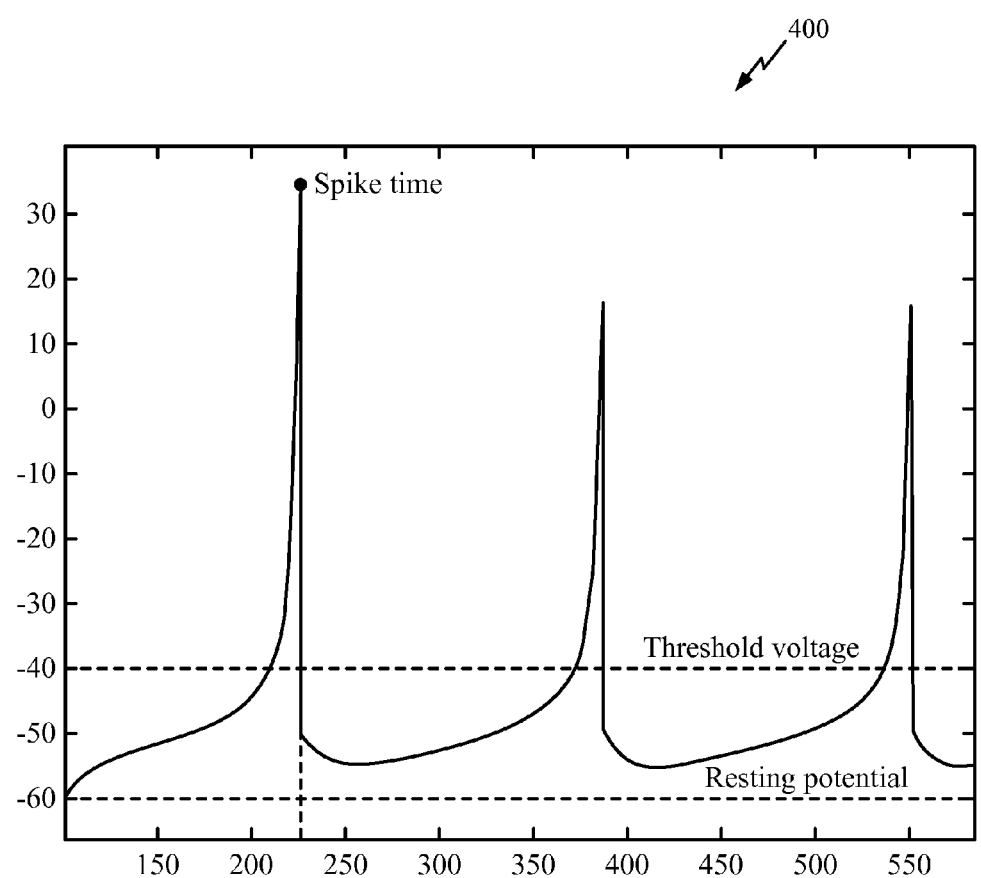
FIG. 4 illustrates an example morphology of a neural spike in accordance with certain aspects of the present disclosure.

FIG. 4 illustrates an example morphology 400 of a neural spike in accordance with certain aspects of the present disclosure. The spike morphology has a few critical regions, such as spike location, behavior around threshold, behavior around resting potential, etc. As aforementioned, critical regions should be represented with higher bit precision. For example, regions around a threshold are important and should be represented with higher resolution, while higher signal amplitudes much larger than the threshold are less important and may be represented with lower resolution.

In order to obtain the encoder graph (non-linear weighting function), the amplitude space may be first divided into 'N' bands. Then, iterative experiments may be performed to assign a "score" (i.e., level of importance) to each band. The weighting curve may simply reflect the relative scores—one simple way is to set the slope of the quantization curve being equal to normalized scores riding offset by the 45-degree line.

Figure 5:
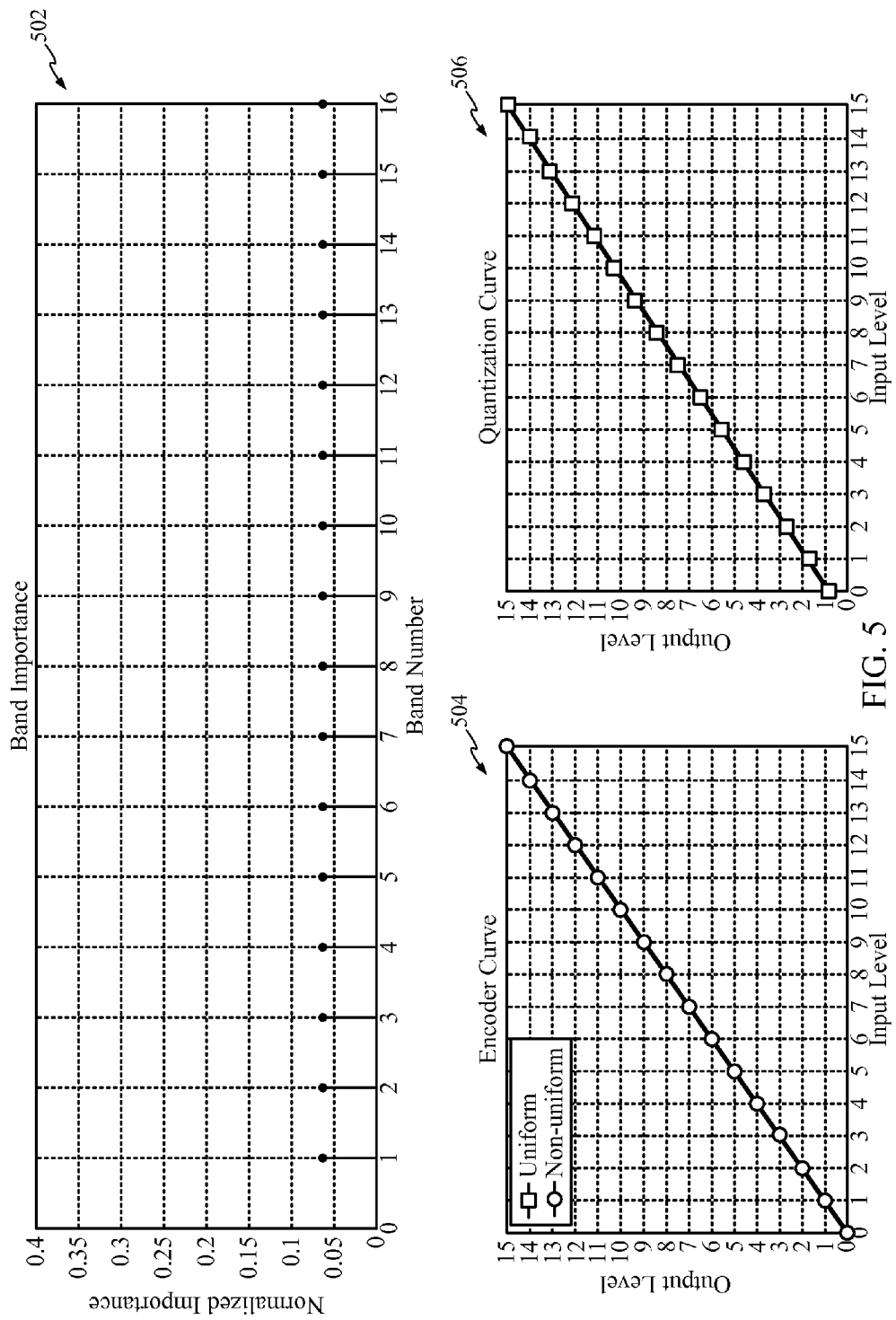
FIG. 5 illustrates an example of uniform quantization in accordance with certain aspects of the present disclosure.

FIG. 5 illustrates an example of uniform quantization in accordance with certain aspects of the present disclosure. As illustrated in a graph 502, 16 bands can be considered, wherein all bands are equally important and the same number of bits can be allocated to each band. There is a total of four bits for representing signal amplitudes in each band resulting into 16 quantization levels. As illustrated in a graph 504 in FIG. 5, the encoder curve is linear, while the quantization is uniform as illustrated in a graph 506.

Figure 6:
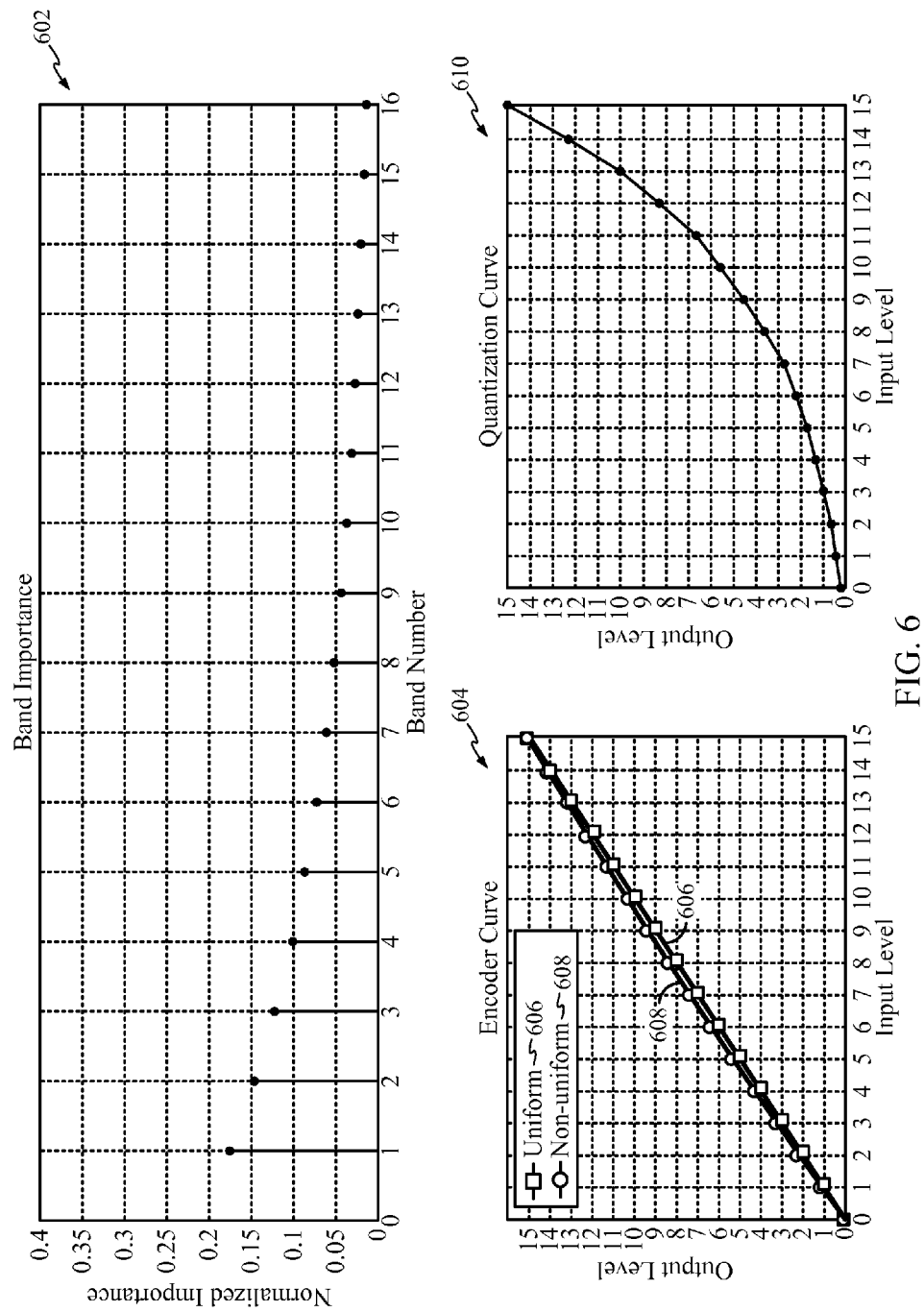
FIG. 6 illustrates an example of non-uniform quantization in accordance with certain aspects of the present disclosure.

FIG. 6 illustrates an example of non-uniform quantization in accordance with certain aspects of the present disclosure. As illustrated in a graph 602, 16 bands can be again considered; however, these bands are not equally important. As illustrated in a graph 604 in FIG. 6, an encoder curve 608 is non-linear, i.e., there is an offset relative to a uniform encoder curve 606. As illustrated in a graph 610, the quantization is non-uniform, i.e., fine resolution (more bits) is utilized for lower input levels (more important bands), wherein coarse resolution (less bits) is utilized for higher input levels (less important bands).

The importance of a band can be found by several methods. In one aspect of the present disclosure, for each band, distribution of amplitudes over a sizeable population (e.g., 10000 spikes) may be observed. Then, a variance of each band may represent a measure of how many quantization levels that band needs. If the variance is larger, then more quantization levels may be assigned to that band, and vice-versa. In another aspect of the present disclosure, uniform bit-allocation may be first applied for each band, and then small perturbations in units of one LSB may be provided. Then, the importance of that band may be inversely proportional to the number of LSB-flips required to breach a given performance criteria (e.g., spike timing jitter).

In order to save memory for internal arithmetic, for intermediate processes on neural dynamics in addition to the non-linear quantization, one can increase robustness to quantization noise by PN dithering. As aforementioned, the PN dithering may essentially systematically introduce +/−k LSBs of noise after quantization. This approach may ensure that errors do not drift towards saturation, and may result into less number of allocated bits for signal representation. The PN dithering may be online (dynamically changing or adaptive) or offline (fixed).

The previous examples describe fixed bit allocation for a given amplitude band. This can be modified to be adaptive to signal morphology. For example, the region around threshold voltage needs to be accurately represented when a spike onset is nearby. On the other hand, the same amplitude level may be less critical when a spike is decaying. Thus, the bit allocation may be based on rules that take into account the temporal (or other domain) behavior of the neural signal.

Methods and apparatus described in the present disclosure provide several advantages. For example, memory footprint for intermediate neural dynamics may be reduced, as well as for storage/transmission of state variables. In addition, optimization of quantization levels is systematic (not heuristic), and depends on the "importance" of an amplitude band being quantized to an overall, pre-defined performance metric.

Figure 7:
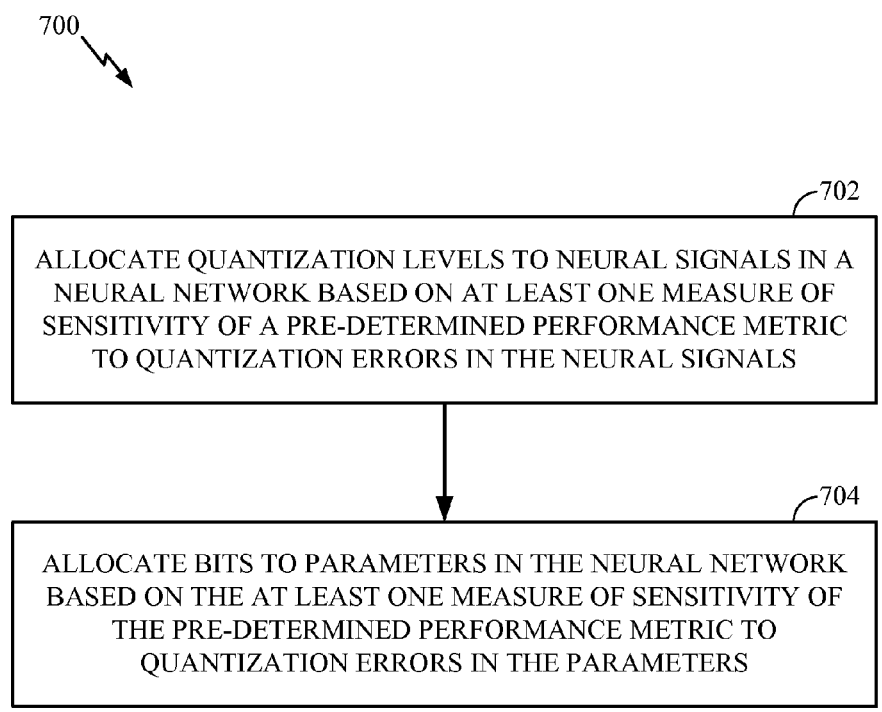
FIG. 7 illustrates example operations of bit-allocation for neural signals and parameters in a neural network in accordance with certain aspects of the present disclosure.

FIG. 7 illustrates example operations 700 of bit-allocation for neural signals and parameters in a neural network in accordance with certain aspects of the present disclosure. At 702, quantization levels may be allocated to the neural signals based on at least one measure of sensitivity of a pre-determined performance metric to quantization errors in the neural signals. At 704, bits may be allocated to the parameters based on the at least one measure of sensitivity of the pre-determined performance metric to quantization errors in the parameters. According to certain aspects of the present disclosure, the neural signals may represent neural dynamics of the neural network, and the parameters may be associated with a circuit of the neural network emulating neural dynamics in the neural network.

In an aspect of the present disclosure, the allocation of quantization levels to the neural signals may be a function of morphology of the neural signals representing neural dynamics. Furthermore, allocating quantization levels to the neural signals may be based on the at least one measure of sensitivity of the pre-determined performance metric and temporal history of the neural signals.

According to certain aspects of the present disclosure, the quantization errors in the neural signals representing neural dynamics may be reduced by systematically dithering a number of Least Significant Bits (LSBs) of the allocated quantization levels. In one aspect, the number of LSBs may be fixed.

In another aspect, the number of LSBs may be adapted based on at least one measure of sensitivity of the pre-determined performance metric to perturbations in the neural signals.

According to certain aspects of the present disclosure, the pre-determined performance metric may comprise at least one of spike timing accuracy, a spiking rate, or sub-threshold behavior associated with the neural signals. The parameters may comprise weights of synapses in the neural network.

According to certain aspects of the present disclosure, allocating quantization levels to the neural signals may comprise encoding and quantization. In one aspect, the encoding may be based on a non-linear function that amplifies certain regions in morphology of the neural signals based on at least one measure of sensitivity of the pre-determined performance metric to quantization noise in each region, and the quantization may be uniform. In another aspect, the encoding and quantization may be both embedded in a quantizer, and the quantizer may be non-uniform with a step size being defined by a non-linear function.

Figure 8:
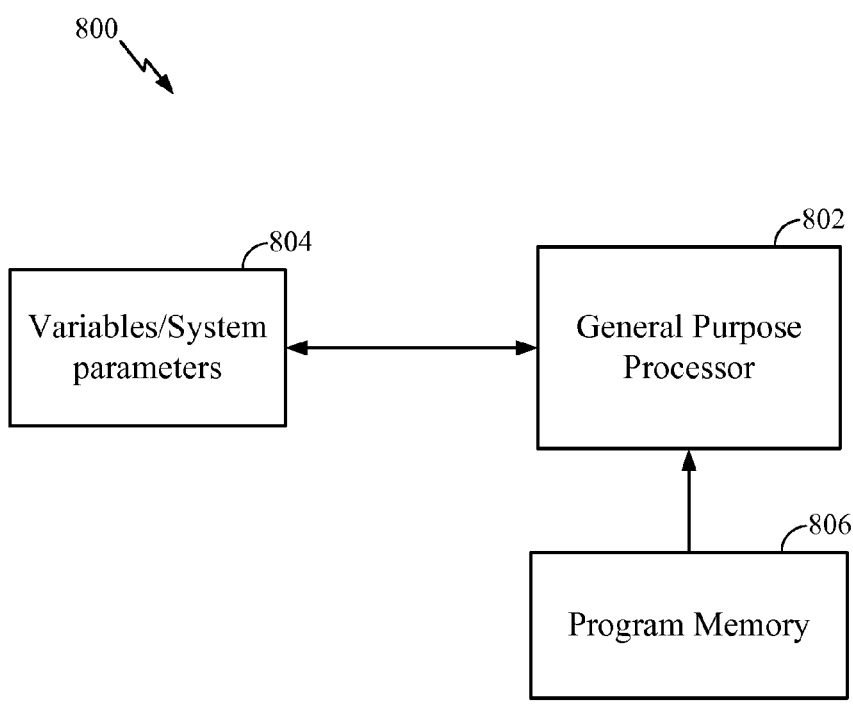
FIG. 8 illustrates an example implementation of bit-allocation for neural signals and parameters in a neural network using a general-purpose processor in accordance with certain aspects of the present disclosure.

FIG. 8 illustrates an example implementation 800 of the aforementioned method for bit-allocation for neural signals and parameters in a neural network using a general-purpose processor 802 in accordance with certain aspects of the present disclosure. Variables (neural signals) and system parameters associated with a computational network (neural network) may be stored in a memory block 804 in the compressed (quantized) form, while instructions related to the bit-allocation being executed at the general-purpose processor 802 may be loaded from a program memory 806. In an aspect of the present disclosure, the instructions loaded into the general-purpose processor 802 may comprise code for allocating quantization levels to the neural signals based on at least one measure of sensitivity of a pre-determined performance metric to quantization errors in the neural signals, and code for allocating bits to the parameters based on the at least one measure of sensitivity of the pre-determined performance metric to quantization errors in the parameters.

Figure 9:
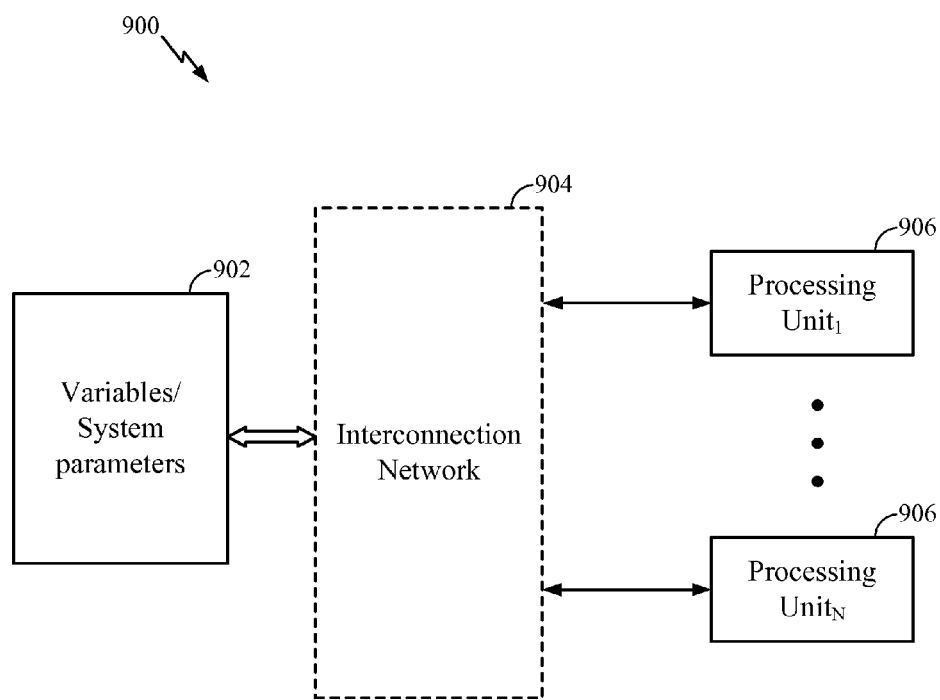
FIG. 9 illustrates an example implementation of bit-allocation for neural signals and parameters in a neural network where a memory may be interfaced with individual distributed processing units in accordance with certain aspects of the present disclosure.

FIG. 9 illustrates an example implementation 900 of the aforementioned method for bit-allocation for neural signals and parameters in a neural network where a memory 902 can be interfaced via an interconnection network 904 with individual (distributed) processing units (neural processors) 906 of a computational network (neural network) in accordance with certain aspects of the present disclosure. Variables (neural signals) and system parameters associated with the computational network (neural network) may be stored in the memory 902 in the compressed (quantized) form, and may be loaded from the memory 902 via connection(s) of the interconnection network 904 into each processing unit (neural processor) 906. In an aspect of the present disclosure, the processing unit 906 may be configured to allocate quantization levels to the neural signals based on at least one measure of sensitivity of a pre-determined performance metric to quantization errors in the neural signals, and allocate bits to the parameters based on the at least one measure of sensitivity of the pre-determined performance metric to quantization errors in the parameters.

Figure 10:
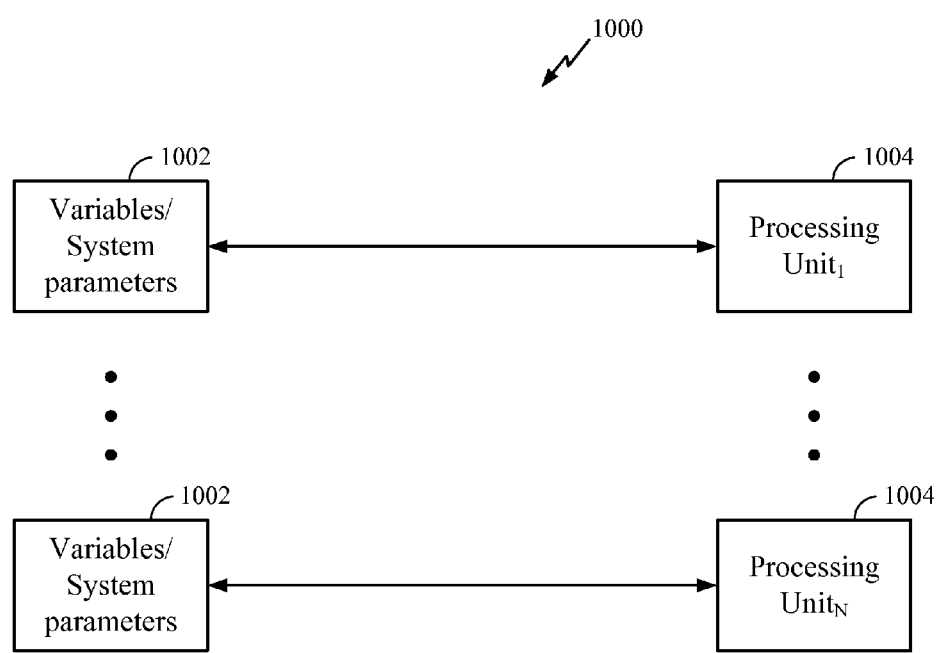
FIG. 10 illustrates an example implementation of bit-allocation for neural signals and parameters in a neural network based on distributed memories and distributed processing units in accordance with certain aspects of the present disclosure.

FIG. 10 illustrates an example implementation 1000 of the aforementioned method for bit-allocation for neural signals and parameters in a neural network based on distributed weight memories 1002 and distributed processing units (neural processors) 1004 in accordance with certain aspects of the present disclosure. As illustrated in FIG. 10, one memory bank 1002 may be directly interfaced with one processing unit 1004 of a computational network (neural network), wherein that memory bank 1002 may store variables (neural signals) and system parameters associated with that processing unit (neural processor) 1004 in the compressed (quantized) form. In an aspect of the present disclosure, the processing unit 1004 may be configured to allocate quantization levels to the neural signals based on at least one measure of sensitivity of a pre-determined performance metric to quantization errors in the neural signals, and allocate bits to the parameters based on the at least one measure of sensitivity of the pre-determined performance metric to quantization errors in the parameters.

Figure 7A:
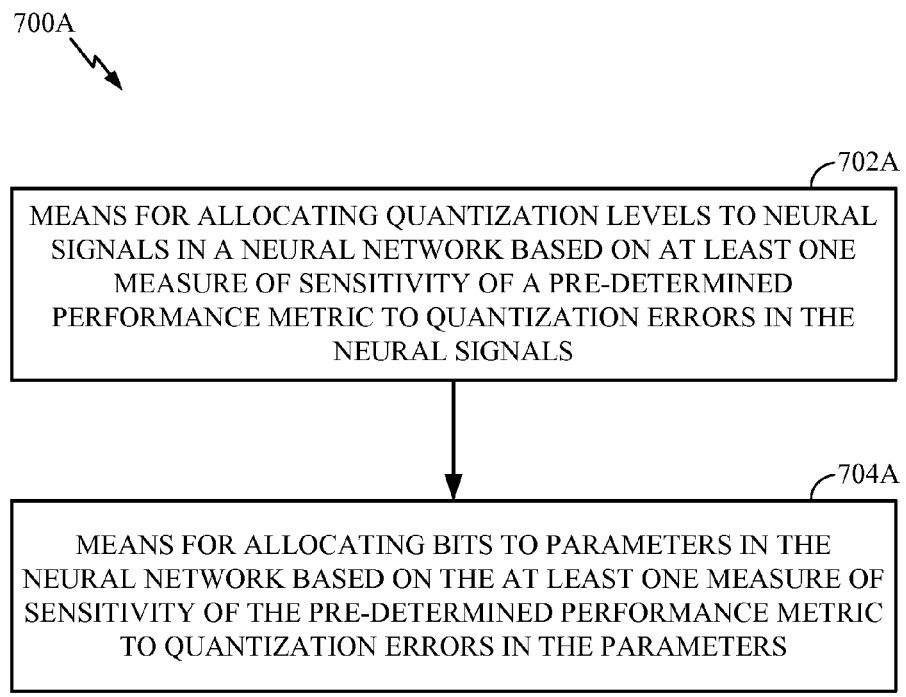
FIG. 7A illustrates example components capable of performing the operations illustrated in FIG. 7.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 700 illustrated in FIG. 7 correspond to components 700A illustrated in FIG. 7A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Bluray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A method of adaptive bit-allocation for neural circuit signals and neural processing parameters in a neural simulator network, comprising:
   for a plurality of synapse circuits in the neural simulator network, dynamically allocating a number of bits to the neural circuit signals based on at least one characteristic of one or more neural potential in the neural simulator network; and
   for the plurality of synapse circuits in the neural simulator network, dynamically allocating a number of bits to at least one neural processing parameter of the synapse circuit based on at least one condition of the neural simulator network;
   wherein the number of bits allocated to a first synapse circuit of the plurality of synapse circuits is increased in response to detecting spike formation and wherein the number of bits allocated to the first synapse circuit of the plurality of synapse circuits is decreased in response to detecting that the synapse circuit has fired.

2. The method of claim 1, wherein the characteristic of one or more neural potential in the neural simulator network comprises a voltage response of the neural potential less than a threshold voltage associated with a firing condition of the synapse circuit.

3. The method of claim 1, wherein the plurality of synapse circuits include a first plurality of synapse circuits configured to weight signals received from a first set of neurons and transmit the weighted signals to a second set of neurons, and wherein allocating the number of bits to at least one neural processing parameter of the synapse circuits comprises of bit allocation to the weights.

4. The method of claim 3, wherein the neural processing parameters comprise weights of synapses in the neural simulator network distributed differently for at least two different synapses of the plurality of synapses.

5. The method of claim 1, further comprising:
   dithering a number of Least Significant Bits (LSBs) of the allocated number of bits to the neural signals.

6. The method of claim 5, wherein the number of LSBs is fixed.

7. The method of claim 5, further comprising:
   adapting the number of LSBs based on at least one characteristic of the neural potential in the neural simulator network.

8. The method of claim 1, wherein the characteristic of neural potential in the neural simulator network comprises spike timing accuracy, spike slope, sub-threshold behavior, or combination thereof; and
   wherein the condition of the neural simulator network comprises learning rate of weight updates.

9. The method of claim 1, wherein allocating the number of bits to the neural circuit signals comprises encoding and quantization.

10. The method of claim 9, wherein:
the encoding is based on a non-linear function that amplifies certain regions in morphology of the neural circuit signals based on at least one characteristic of the neural potential in each region, and the quantization is uniform.

11. The method of claim 9, wherein:
the encoding and quantization are embedded in a quantizer, and
the quantizer is non-uniform with a step size being defined by a non-linear function.

12. The method of claim 1, wherein allocating the number of bits to the neural circuit signals comprises assigning a greater number of bits where quantization errors in the neural circuit signals would result in a greater fluctuation in the characteristic of the one or more neural potentials of the neural simulator network; and
wherein allocating the number of bits to at least one neural processing parameter of the synapse circuit comprises assigning a greater number of bits where quantization errors in the neural processing parameters would result in a greater fluctuation in the condition of the neural simulator network.

13. An apparatus for adaptive bit-allocation for neural circuit signals and neural processing parameters in a neural simulator network, comprising:
a first circuit configured to dynamically allocate a number of bits to the neural circuit signals based on at least one characteristic of one or more neural potential in the neural simulator network; and
a second circuit configured to dynamically allocate a number of bits to at least one neural processing parameters of a plurality of synapse circuits based on at least one condition of the neural simulator network;
wherein the number of bits allocated to a first synapse circuit of the plurality of synapse circuits is increased in response to detecting spike formation and wherein the number of bits allocated to the first synapse circuit of the plurality of synapse circuits is decreased in response to detecting that the synapse circuit has fired.

14. The apparatus of claim 13, wherein the characteristic of one or more neural potential in the neural simulator network comprises a voltage response of the neural potential less than a threshold voltage associated with a firing condition of the synapse circuit.

15. The apparatus of claim 13, wherein the plurality of synapse circuits include a first plurality of synapse circuits configured to weight signals received from a first set of neurons and transmit the weighted signals to a second set of neurons, and wherein allocating the number of bits to at least one neural processing parameter of the synapse circuits comprises of bit allocation to the weights.

16. The apparatus of claim 15, wherein the neural processing parameters comprise weights of synapses in the neural simulator network distributed differently for at least two different synapses of the plurality of synapses.

17. The apparatus of claim 13, further comprising:
dithering a number of Least Significant Bits (LSBs) of the allocated number of bits to the neural signals.

18. The apparatus of claim 17, wherein the number of LSBs is fixed.

19. The apparatus of claim 17, wherein a third circuit is also configured to:
adapt the number of LSBs based on at least one characteristic of the neural potential in the neural simulator network.

20. The apparatus of claim 13, wherein the characteristic of neural potential comprises spike timing accuracy, spike slope, sub-threshold behavior, or combination thereof associated with the neural signals; and
wherein the condition of the neural simulator network comprises learning rate of weight updates.

21. The apparatus of claim 13, wherein allocating a number of bits to the neural circuit signals comprises encoding and quantization.

22. The apparatus of claim 21, wherein:
the encoding is based on a non-linear function that amplifies certain regions in morphology of the neural circuit signals based on at least one characteristic of the neural potential in each region, and the quantization is uniform.

23. The apparatus of claim 21, wherein:
the encoding and quantization are embedded in a quantizer, and
the quantizer is non-uniform with a step size being defined by a non-linear function.

24. The apparatus of claim 13, wherein allocating the number of bits to the neural circuit signals comprises assigning a greater number of bits where quantization errors in the neural circuit signals would result in a greater fluctuation in the characteristic of the one or more neural potentials of the neural simulator network; and
wherein allocating the number of bits to at least one neural processing parameter of the synapse circuit comprises assigning a greater number of bits where quantization errors in the neural processing parameters would result in a greater fluctuation in the condition of the neural simulator network.

25. An apparatus for adaptive bit-allocation for neural circuit signals and neural processing parameters in a neural simulator network, comprising:
means for dynamically allocating a number of bits to the neural circuit signals based on at least one characteristic of one or more neural potential in the neural simulator network; and
means for dynamically allocating a number of bits to at least one neural processing parameter of a plurality of synapse circuits based on at least one condition of the neural simulator network;
wherein the number of bits allocated to a first synapse circuit of the plurality of synapse circuits is increased in response to detecting spike formation and wherein the number of bits allocated to the first synapse circuit of the plurality of synapse circuits is decreased in response to detecting that the synapse circuit has fired.

26. The apparatus of claim 25, wherein the characteristic of one or more neural potential in the neural simulator network comprises a voltage response of the neural potential less than a threshold voltage associated with a firing condition of the synapse circuit.

27. The apparatus of claim 25, wherein the plurality of synapse circuits include a first plurality of synapse circuits configured to weight signals received from a first set of neurons and transmit the weighted signals to a second set of neurons, and wherein allocating the number of bits to at least one neural processing parameter of the synapse circuits comprises of bit allocation to the weights.

28. The apparatus of claim 27, wherein the neural processing parameters comprise weights of synapses in the neural simulator network distributed differently for at least two different synapses of the plurality of synapses.

29. The apparatus of claim 25, further comprising:
dithering a number of Least Significant Bits (LSBs) of the allocated number of bits to the neural signals.

30. The apparatus of claim 29, wherein the number of LSBs is fixed.

31. The apparatus of claim 29, further comprising:
means for adapting the number of LSBs based on at least one characteristic of the neural potential in the neural simulator network.

32. The apparatus of claim 25, wherein the characteristic of neural potential comprises one of spike timing accuracy, spike slope, sub-threshold behavior, or combination thereof associated with the neural signals; and
wherein the condition of the neural simulator network comprises learning rate of weight updates.

33. The apparatus of claim 25, wherein allocating a number of bits to the neural circuit signals comprises encoding and quantization.

34. The apparatus of claim 33, wherein:
the encoding is based on a non-linear function that amplifies certain regions in morphology of the neural circuit signals based on at least one characteristic of the neural potential in each region, and the quantization is uniform.

35. The apparatus of claim 33, wherein:
the encoding and quantization are embedded in a quantizer, and
the quantizer is non-uniform with a step size being defined by a non-linear function.

36. The apparatus of claim 25, wherein allocating the number of bits to the neural circuit signals comprises assigning a greater number of bits where quantization errors in the neural circuit signals would result in a greater fluctuation in the characteristic of the one or more neural potentials of the neural simulator network; and
wherein allocating the number of bits to at least one neural processing parameter of the synapse circuit comprises assigning a greater number of bits where quantization errors in the neural processing parameters would result in a greater fluctuation in the condition of the neural simulator network.

37. A computer program product for adaptive bit-allocation for neural circuit signals and neural processing parameters in a neural simulator network, comprising a non-transitory computer-readable medium comprising code for:
dynamically allocating a number of bits to the neural circuit signals based on at least one characteristic of one or more neural potential in the neural simulator network; and
dynamically allocating a number of bits to at least one neural processing parameter of a plurality of synapse circuits based on at least one condition of the neural simulator network;
wherein the number of bits allocated to a first synapse circuit of the plurality of synapse circuits is increased in response to detecting spike formation and wherein the number of bits allocated to the first synapse circuit of the plurality of synapse circuits is decreased in response to detecting that the synapse circuit has fired.

38. The computer program product of claim 37, wherein the characteristic of one or more neural potential in the neural simulator network comprises a voltage response of the neural potential less than a threshold voltage associated with a firing condition of the synapse circuit.

39. The computer program product of claim 37, wherein the plurality of synapse circuits include a first plurality of synapse circuits configured to weight signals received from a first set of neurons and transmit the weighted signals to a second set of neurons, and wherein allocating the number of bits to at least one neural processing parameter of the synapse circuits comprises of bit allocation to the weights.

40. The computer program product of claim 39, wherein the neural processing parameters comprise weights of synapses in the neural simulator network distributed differently for at least two different synapses of the plurality of synapses.

41. The computer program product of claim 37, wherein the non-transitory computer-readable medium further comprising code for:
dithering a number of Least Significant Bits (LSBs) of the allocated number of bits to the neural signals.

42. The computer program product of claim 41, wherein the number of LSBs is fixed.

43. The computer program product of claim 41, wherein the non-transitory computer-readable medium further comprising code for:
adapting the number of LSBs based on at least one characteristic of the neural potential in the neural simulator network.

44. The computer program product of claim 37, wherein the characteristic of neural potential comprises spike timing accuracy, spike slope, sub-threshold behavior, or combination thereof; and
wherein the condition of the neural simulator network comprises learning rate of weight updates.

45. The computer program product of claim 37, wherein allocating a number of bits to the neural circuit signals comprises encoding and quantization.

46. The computer program product of claim 45, wherein:
the encoding is based on a non-linear function that amplifies certain regions in morphology of the neural circuit signals based on at least one characteristic of the neural potential in each region, and the quantization is uniform.

47. The computer program product of claim 45, wherein:
the encoding and quantization are embedded in a quantizer, and
the quantizer is non-uniform with a step size being defined by a non-linear function.

48. The computer program product of claim 37, wherein allocating the number of bits to the neural circuit signals comprises assigning a greater number of bits where quantization errors in the neural circuit signals would result in a greater fluctuation in the characteristic of the one or more neural potentials of the neural simulator network; and
wherein allocating the number of bits to at least one neural processing parameter of the synapse circuit comprises assigning a greater number of bits where quantization errors in the neural processing parameters would result in a greater fluctuation in the condition of the neural simulator network.

* * * * *